(No Model.) 4 Sheets—Sheet 1.
A. B. RONEY.
ELECTRIC CAR BRAKE.
No. 566,939. Patented Sept. 1, 1896.
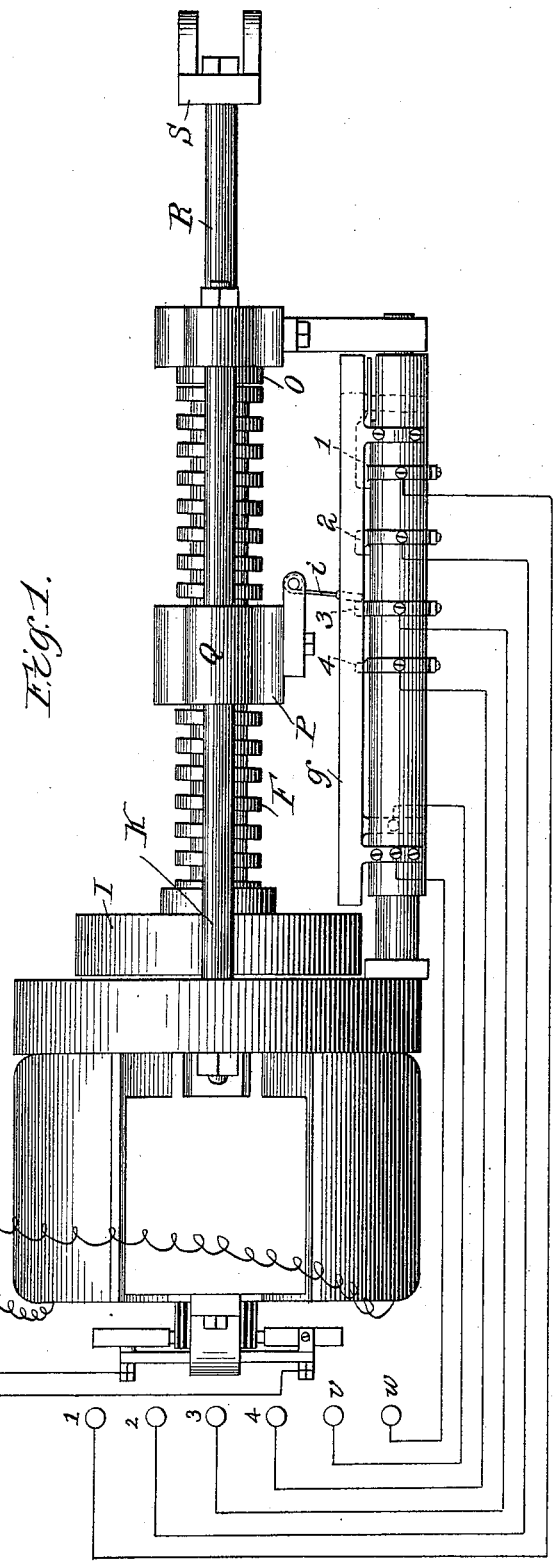

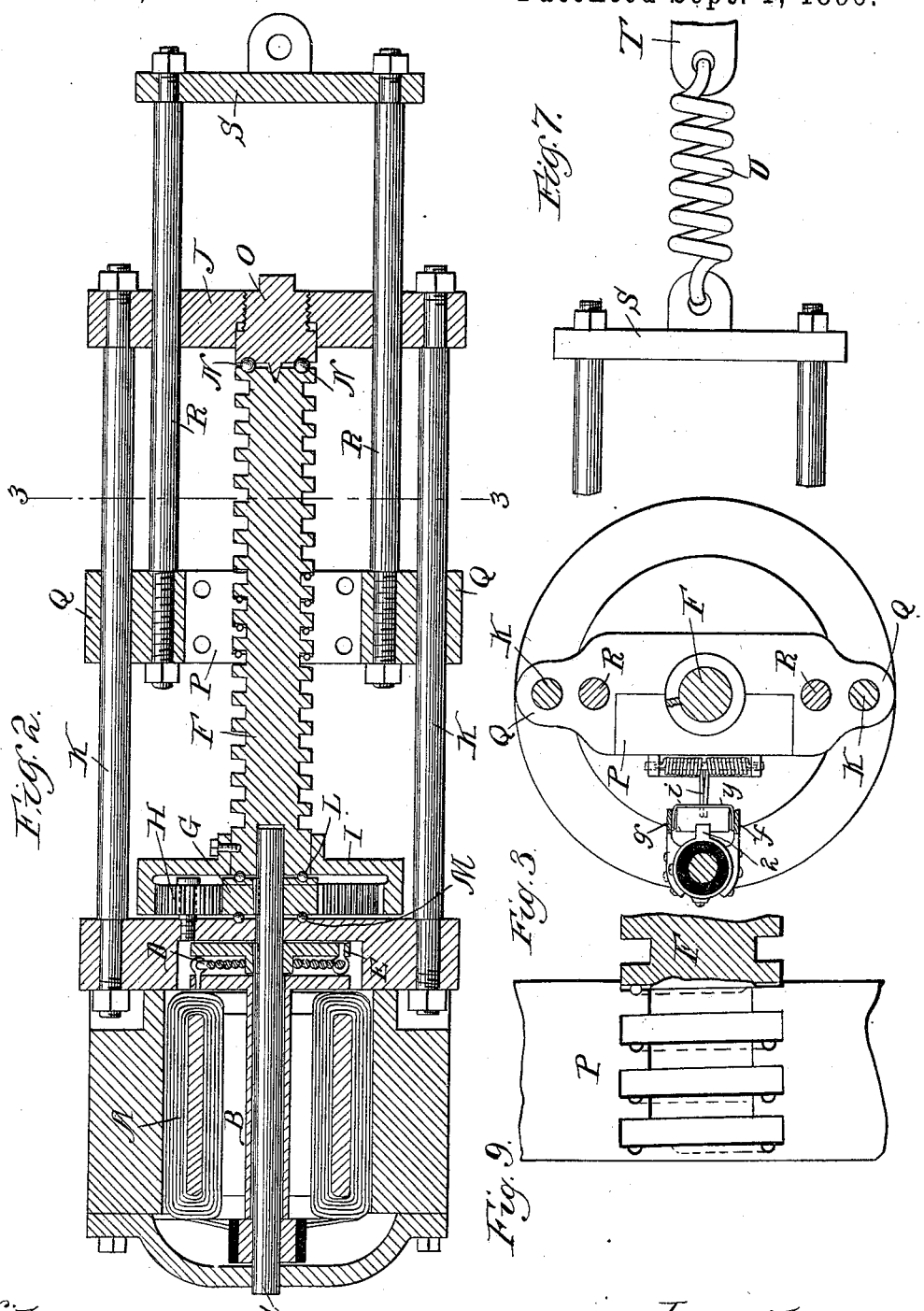

(No Model.) 4 Sheets—Sheet 3.

A. B. RONEY.
ELECTRIC CAR BRAKE.

No. 566,939. Patented Sept. 1, 1896.

Witnesses.
Wm. M. Rheem
Wm. F. Henning

Inventor.
A. B. Roney
by Raymond & Ouohundro Attys

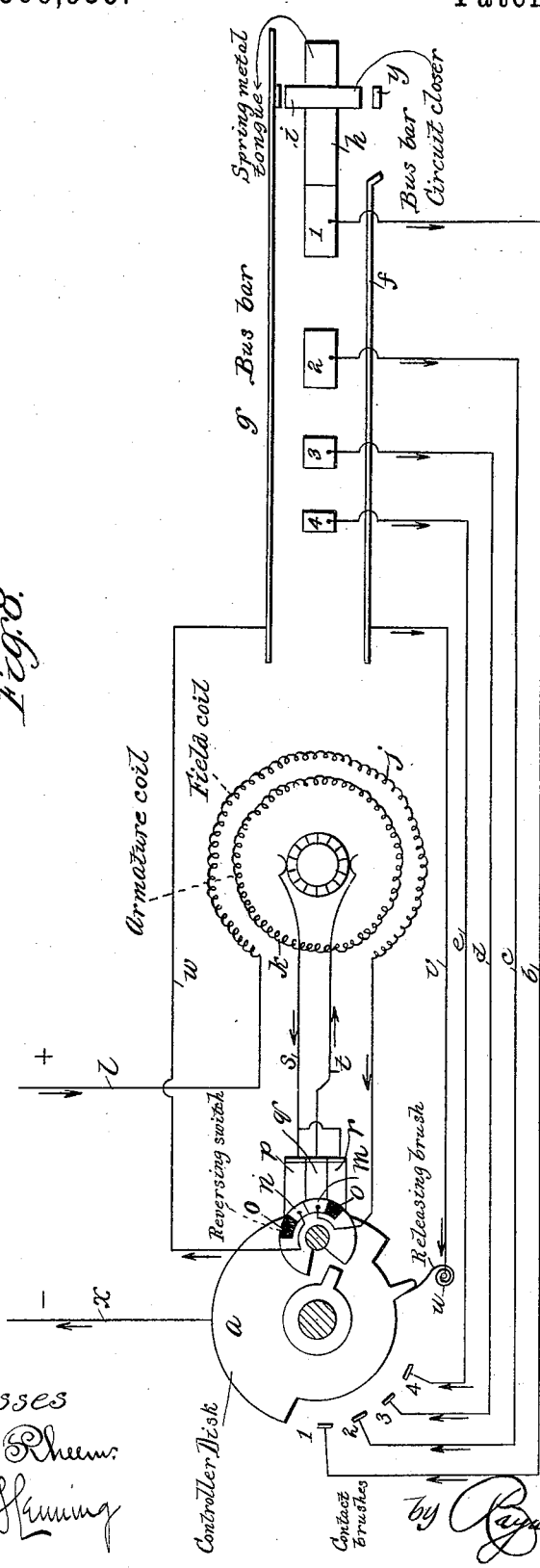

UNITED STATES PATENT OFFICE.

ALEXANDER B. RONEY, OF CHICAGO, ILLINOIS, ASSIGNOR TO PHILIP OPPER, OF SAME PLACE.

ELECTRIC CAR-BRAKE.

SPECIFICATION forming part of Letters Patent No. 566,939, dated September 1, 1896.

Application filed April 2, 1895. Serial No. 544,155. (No model.)

*To all whom it may concern:*

Be it known that I, ALEXANDER B. RONEY, a citizen of the United States, residing at Chicago, in the county of Cook and State of Illinois, have invented certain new and useful Improvements in Electric Car-Brakes, of which the following is a full, clear, and exact description, reference being had to the accompanying drawings, forming a part of this specification.

This invention relates to improvements in electric car-brakes, and more particularly to those intended for use in connection with street-cars in which the brake is operated solely by electricity, both in application and release.

The prime object of this invention is a brake of this class capable of making both "service" and "emergency" applications of the brakes at the will of the operator and of such character that the brakes will remain set at any desired pressure without the use of electricity to hold them.

Another object is to have the brake mechanism so operated that the brakes may be set with any desired pressure, from the minimum to the maximum, and the pressure from that point either increased to the full maximum gradually or suddenly, or decreased so as to release the brakes either gradually or suddenly.

A further object is to have brakes of this character operated by an electric motor the armature of which shall have a yielding engagement with its shaft, or the power-shaft, whereby breakage and stalling of the apparatus is avoided and the motor is enabled to get under speed before it commences to apply braking power.

A still further object is to have a yielding connection between the electric motor and the brake-rod of such character that when the brake-pressure applied by the motor exceeds the desired maximum the motor will be automatically cut out, whereby the motor is protected from injury in the event of disarrangement of the brake-gear or other operating parts of the apparatus, while at the same time the limit is put upon the maximum pressure obtainable, so as to prevent skidding or sliding of the wheels, as well as breakage of any parts of the apparatus due to excessive strains.

These and such other objects as will hereinafter appear are attained by the devices illustrated in the accompanying drawings, in which—

Figure 4:
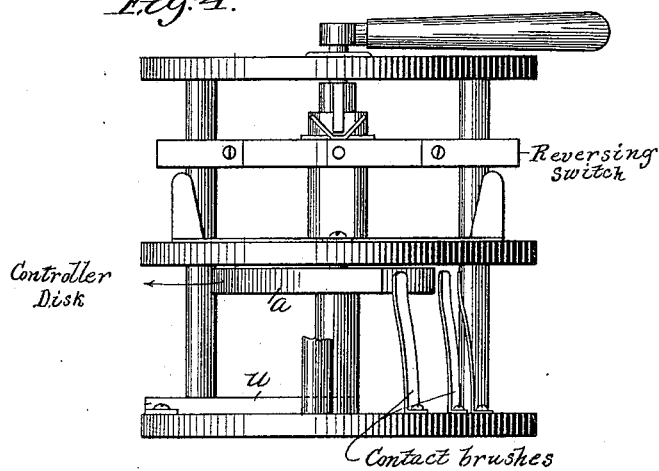
Figure 5:
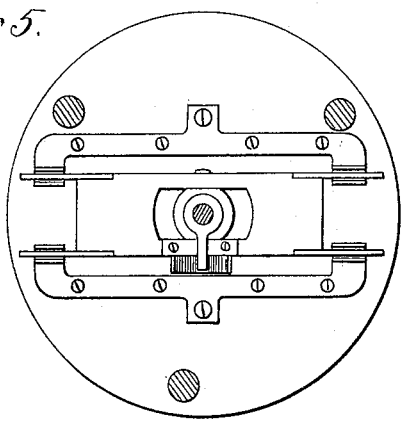
Figure 6:
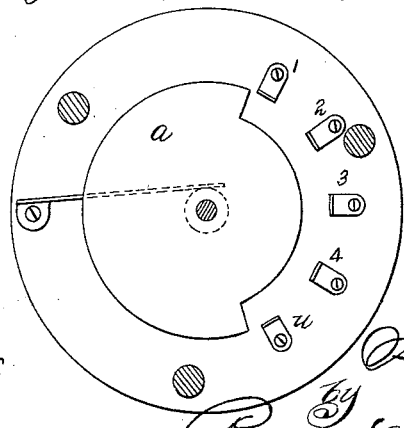

Figure 1 represents a plan view of an electric car-brake embodying my invention. Fig. 2 is a central longitudinal section thereof. Fig. 3 represents a transverse vertical section on the line 3 3 of Fig. 2. Figs. 4, 5, and 6 are detail views of the control device. Fig. 7 is a detail of the connection between the draw-bar and the brake-rod, and Fig. 8 a diagrammatic view illustrating the electrical connections for controlling and operating the apparatus.

Similar letters and figures of reference indicate the same parts in the several figures of the drawings.

In the practical use of my invention any suitably-constructed electric motor may be employed, and the apparatus may be used in connection with any kind of brake-rigging. It is not deemed necessary to herein illustrate any of the brake-rigging, but simply the part of my apparatus with which the brake-rigging connects. As to the motor, I have shown in the drawings one of a kind that I have constructed and practically used, but it is shown herein solely for the purpose of illustration, as it will be apparent that the particular construction and arrangement of the motor is not an essential part of this invention, except as to such parts as I shall particularly describe, and point out in the claims. So, also, with the control devices and the circuits connecting the same with the motor. The arrangement herein shown and the control device illustrated represent an arrangement and devices that I have practically used; but obviously this arrangement may be varied in many ways without departing from the spirit of my invention. Their illustration is to afford a clear understanding of the invention.

Referring now to the drawings, A indicates the armature of an electric motor, which motor and armature may be of the usual or any desired form and construction, with the exception that I propose an armature which shall have a limited free motion, either upon its own shaft or in conjunction with the power-shaft to which its rotations are to be imparted. As illustrated in the drawings, the armature is mounted upon a sleeve B, which is loose upon the armature-shaft C, but is connected with said shaft by a coil-spring, rope, or cable D, one end of which is connected with the sleeve and the other end with a disk E, keyed upon the armature-shaft. This spring or rope connection affords a yielding connection between the armature and its shaft whereby the armature may revolve freely upon its shaft several revolutions before locking with it and causing the rotation of the shaft. Where a rope or cable is used, it is obvious that the armature will be free to make several revolutions on its shaft in either direction before locking therewith or imparting motion thereto. If this double freedom of the armature is desired where springs are used, a pair of springs oppositely connected and oppositely working may be employed, one as a yielding lock when the armature rotates in one direction and the other as a yielding lock when the armature rotates in the opposite direction. This would mean merely a duplication of the connection illustrated in the drawings, and it is not believed that illustration thereof is necessary for the clear understanding of the same. There is connected with the armature-shaft, either with or without the interposition of reducing-gears, a screw-threaded shaft F, which I will denominate as the "power-shaft" of the machine, as it is through this threaded shaft that the rotary power of the motor is converted into a rectilinear force applied to the brake-gearing. As shown in the drawings, a spur-gear G is keyed upon the armature-shaft and meshes with a transmitting-gear H, loosely journaled upon the gear-frame of the motor, which gear H in turn meshes with an internal peripheral gear I, keyed upon the end of the power-shaft F, so that while the speed of the motor is reduced in its transmission to the power-shaft its power is greatly modified.

The armature-shaft is journaled loosely in the rigid frame of the motor, and the end of the power-shaft is socketed to receive the end of the armature-shaft which affords one end bearing for the power-shaft. The other end bearing of the power-shaft is in a gland J, some distance removed from the motor, but rigidly connected with the frame thereof by tie-rods K, which latter thus serve to hold the gland J rigidly in position with relation to the motor-frame.

To relieve the end thrust of the power-shaft in operation and reduce the friction that is occasioned thereby, I prefer to interpose between the end of this shaft and the spur-gear G a series of antifriction-balls L, and between said gear and the face of the motor-frame a series of antifriction-balls M, so that the end thrust of the screw toward the motor is transmitted through these ball-bearings direct to the rigid frame of the motor and is thereby reduced to an unobjectionable degree. The end thrust in the opposite direction is taken up by a series of antifriction-balls N, interposed between the opposite end of the power-shaft and an adjustable bearing O, having a screw-threaded connection with the gland J, of which it in effect forms a part, the adjustability of this bearing providing a means for taking up the wear of the parts and for ready adjustment of the parts either in operation or in being assembled.

Working upon the screw-threaded power-shaft and playing between the motor-frame and the gland J is a nut P, which, as more clearly illustrated in Fig. 3, is made in two parts for convenience in assembling the parts. This nut is provided with eyes Q, which slide freely upon the tie-rods K, which thus serve to guide the nut in its reciprocations upon the screw, it being understood that as the screw is being held against longitudinal movement, whenever the screw is rotated, the nut, by reason of its engagement with the tie-rods, is compelled to move endwise upon the screw.

To the nut are rigidly secured the ends of rods R, which work through perforations in the gland J and are connected at their opposite ends by a yoke S, so that these rods and yoke together constitute the draw-bar of the apparatus to which the brake-rod is coupled.

Between the brake-rod T and the draw-bar is interposed a powerful coil-spring U, the purpose of which is to allow the motor to operate and move the working parts of the brake apparatus in the event that the brake-rigging should for any reason become fixed or set. If a yielding connection of this kind between the brake-rigging and my apparatus were not employed, and the brake-rigging were stuck or jammed or for any reason would not work, if a heavy current were thrown upon the motor the motor or some of its connected parts would undoubtedly be broken or damaged, probably beyond usefulness. With such a yielding connection, however, the motor would simply move to the point of applying the brakes, as desired, simply stretching the coil-spring, and then the motor would cut itself out in a manner to be described farther on, and hence no harm would result. This yielding connection affords a further safeguard in the application of the brakes by limiting the maximum power that can be applied to the brakes, that is, by interposing a coil-spring the strength of which represents the maximum power to be applied to the brakes. When this maximum is reached, the further operation of the motor would simply stretch the spring without materially increasing the power applied to the brakes. Perhaps the most important use of this yielding connection between the brake-rigging and the apparatus is, instead of using it merely as a safety device, as above described, to give it the added function of the direct means for applying the pressure to the brake-shoes by so arranging the spring that as soon as the brake-shoes come to a firm bearing upon the car-wheels the spring will be brought into play. Of course springs, either compression or expansion springs, of many kinds can be employed for this purpose, the power of which will increase or decrease as the spring is expanded or compressed, so that after all the slack has been taken out of the brake-rigging the force of the motor and its connections will be transmitted through the spring or other yielding connection with constantly-increasing force as the spring is expanded or compressed, thus enabling the adjustment of the pressure upon the brake-shoes to a nicety, according to the exigencies of the case, and at the same time providing a limit of pressure by a proper proportion and arrangement of the parts as a safeguard against the breaking down of the motor in case the brake-rigging should become stuck. Hence a spring requiring any desired amount of power to compress or expand the same per inch, if employed for this yielding connection, will establish the amount of pressure of the brake-shoes on the wheel for every inch of travel of the nut or the screw, thereby giving to the motorman a comparatively exact gage of the pressure at which the brakes are set. In this class of apparatus it is desirable that the brakes may be applied quickly and with any desired degree of force, or with gradually-increasing force, or with full or maximum force; and to accomplish this desirable object I propose to provide means whereby the motor will automatically cut itself out of circuit and stop the nut and consequently stop the application of the power (but without releasing the brakes) at different points in the travel of the nut through which the power of the motor is applied to the brake-rigging. Obviously many different devices may be employed for this purpose, and I have shown in diagrammatic drawings in Fig. 8 a controller and connections between it and the motor which illustrate one form of apparatus by which this feature of my invention may be carried out.

Referring now more particularly to Fig. 8, let $a$ represent the controller-disk, and 1, 2, 3, and 4 represent the four contact-brushes with which the disk engages and contact-blocks with which a circuit-closer on the nut P engages. The contact-brush 1 is connected with the contact-block 1 and by wire $b$, and the other contact-blocks by the wires $c$, $d$, and $e$, respectively. $f$ and $g$ indicate a pair of bus-bars, the former a little shorter than the latter, and $h$ a spring-tongue connected with the contact-block 1. The circuit-closer $i$ is of a yielding character and attached to the nut P in such position as to make successive engagements with the contact-blocks 1, 2, 3, and 4 during the travel of the nut back and forth. The field-circuit is represented by $j$ and the armature-circuit by $k$, the former being connected at one end with one of the line-wires $l$ and at its opposite end with a contact-block $m$ upon a reversing-switch, which carries also another contact-block $n$ and two insulated portions $o$. This reversing-switch, which is circular in form and constitutes a part of the controller, is opposed by contact-blocks $p$, $q$, and $r$, the two $p$ and $r$ of which are connected by wires $s$ with one of the armature-brushes and the other by wire $t$ with the other armature-brush. The contact-blocks $m$ and $n$ are arranged side by side, so that in one position thereof these two contact-blocks will be respectively in circuit with the contact-blocks $p$ and $q$, while the contact-block $r$ is opposed by one of the insulating-sections $o$, and in a reverse position the two contact-blocks $m$ and $n$ are in circuit with the contact-blocks $q$ and $r$, and the block $p$ is opposed by an insulated portion $o$. A releasing-brush $u$ is connected by wire $v$ with the bus-bar $f$, while the bus-bar $g$ is connected by wire $w$ with the contact-block $n$ on the reversing-switch. The other line-wire $x$ is connected with the controller-disk.

The explanation of the operation of the controller, the motor, and the circuits connected therewith is as follows: As illustrated in Fig. 8, the controller is in position where no current is flowing to the motor, the circuits being all cut out and the nut and draw-bar at their limit of forward movement, and of course the brakes are released. To apply pressure, the controller-handle is moved around until the motor-disk $a$ touches contact-brush 1. The reversing-switch has now been thrown and the circuits are closed. The current passes through the field-coils through the reversing-switch, thence through the armature-coils back to the reversing-switch, thence to the bus-bar $g$ through circuit-closer $i$ to contact-block 1 and out through the controller-disk. The motor is now reversed, the threaded power-shaft F drawing the nut P forward, and with it the circuit-closer $i$, until the circuit-closer snaps off of contact-block 1 onto contact-block 2. This serves to break the circuit through the motor, and consequently automatically arrests its operation, but prepares circuit No. 2 for a further operation of the motor when the controller-disk is moved to engage the contact-brush 2.

To apply a greater pressure to the brakes, the controller-disk is turned until it engages the contact No. 2, when the circuit will be again closed, and the motor will operate as before described until the circuit-closer leaves contact-block 2 and swings into engagement with contact-block 3, which action breaks circuit No. 2 and again automatically arrests the operation. This operation is repeated with each of the other contacts, and obviously there may be as many of these circuits as may be desired, each of which represents a portion of the maximum power which may be applied to the brakes. It will also be observed that, by reason of the employment of the screw power shaft and nut, when the brakes are set at any point they will remain set without the use of any more current, and will hold the brakes applied as long as desired. It will be observed that the circuit-closer $i$ travels between the bus-bars $f$ and $g$, and serves to furnish an independent connection between these bus-bars in all positions, except at the very commencement of the work. This independent connection is used only for reversing the motor, and it is only after the motor has been reversed and enough run back to its initial position that the circuit-closer breaks this connection, at which time the brakes are released. During all of the makes and breaks of the current, while the nut is running forward in the operation of setting the brakes, the reversing-switch remains in the same position, thus enabling the controller-disk to close the circuits through the contact-brushes 1, 2, 3, and 4 in succession for different braking-pressures, or through all at once for immediately applying the maximum braking-pressure in affecting emergency stops without disturbing the direction in which the motor revolves. To reverse the motor, the controller is moved in the opposite direction until all of the contact-brushes 1, 2, 3, and 4 are disconnected therefrom, and a further movement of the disk will throw the reversing-switch in the opposite position, thus connecting up the releasing-brush $u$ with the bus-bar $f$, which bar being already connected with bus-bar $g$ through the circuit-closer the circuit will now be closed through the armature in the opposite direction. The motor now starts up and the nut is run back until the circuit-closer passes beyond the bus-bar $f$, thereby breaking the circuit, stopping the motor, and reëstablishing the connections for circuit No. 1 through contact brushes and blocks 1 ready for operation of the motor in the opposite direction to again apply the brakes. If only a partial release is desired, the contact between the disk and the releasing-brush is made by quick touches, which allow the current to flow through the motor for a slight release, the making and breaking of the releasing-circuit being now down between the controller-disk and the releasing-brush.

As shown in the drawings and more particularly in Figs. 1 and 3, the contact-blocks 1, 2, 3, and 4 are mounted upon an insulating sleeve or block suitably supported upon a rod extending between the frame of the motor and the gland. The bus-bars $f$ and $g$ are also supported upon this insulating sleeve or block, which prevents short-circuiting.

The circuit-closer $i$ is simply a block of metal secured to one end of a coil or coil spring or springs, the opposite ends of which are secured to suitable fastenings on the nut P, so that the normal tendency of the tension of the free end of the spring supporting the block is to hold the same at a right angle to its support, as shown in Fig. 1, so that close but yielding contact will be made between this circuit-closer and the contact-blocks 1, 2, 3, and 4, which project into its path of travel and are so disposed that when the circuit-closer snaps off of one contact-block it will be thrown by the spring into contact with the other block, and thus not only avoid the destructive arcing by its quick movement, but also serves to automatically establish the next circuit in advance. To the spring of the circuit-closer $i$ is also secured a U-shaped piece $y$, which serves to establish the independent circuit between the two bus-bars.

To relieve friction between the power-shaft and the nut P when braking-power is being applied, I provide a groove in one lateral face of the threads in the nut, which grooves terminate near each end of the threads and into which grooves are placed a series of balls upon which the threads of the shaft directly bear, more particularly when power is being applied. The closing of the ends of the grooves prevents the balls from running out of the nut, and by the employment of this antifriction connection the efficiency of the apparatus is enhanced.

I do not desire to limit myself to the particular construction and arrangement of devices shown in the drawings, for obviously various modifications and changes may be made in the same without departing from the spirit of my invention. For instance, any means for guiding the nut and holding it against rotation may be employed, and any means may be employed for securing the yielding connection between the armature and the power-shaft, or such connection may be omitted altogether, and, while I have shown and described my invention in its application to a car-brake, obviously it is capable of many other uses, and the draw-bar or actuating-nut may be connected in any suitable manner with any other device or suitable apparatus to which power or movement is desired to be applied.

A car-brake constructed in accordance with my invention is simple, cheap, durable, and exceedingly effective, having few parts to get out of order, applying great power where power is needed, and occupying a small space that particularly adapts it for street-car uses. It enables the gradual application of the power in any desired degree, or the full and instantaneous application of the maximum braking-power, and it enables the holding of the brakes set with any desired degree of force upon a downgrade, without the expenditure of any electrical energy.

Having described my invention, what I claim, and desire to secure by Letters Patent, is—

1. In an electric car-brake, the combination with a motor, a screw-threaded shaft driven thereby, and a yielding connection between said shaft and the armature of the motor, of a nut working on said shaft and held against rotation, and a brake-rod connected with, and actuated by said nut, substantially as described.

2. In an electric car-brake, the combination with a motor, a screw-threaded shaft driven thereby, and a yielding connection between said shaft and the armature of the motor, of a nut working on said shaft and held against rotation, a brake-rod and a yielding connection between said rod and nut, substantially as described.

3. In an electric car-brake, the combination with a motor provided with an armature loosely mounted upon its shaft, a yielding connection between said shaft and the armature, and a screw-threaded shaft driven by the armature-shaft, of a nut working upon said screw-threaded shaft and held against rotation, and a brake-rod connected with and actuated by said nut, substantially as described.

4. In an electric car-brake, the combination with a motor provided with an armature loosely mounted upon its shaft, a yielding connection between said armature and shaft, a screw-threaded shaft located in axial line with the armature-shaft, and gearing connecting said shafts, of a nut working upon the screw-threaded shaft and held against rotation, and a brake-rod connected with, and actuated by, said nut, substantially as described.

5. The combination with an electric motor comprising an armature wound upon a sleeve, a shaft upon which the sleeve is loosely journaled, a disk on the sleeve, a disk on the shaft, and a rope, or its equivalent, secured at its ends respectively to said disks, of a screw-threaded shaft geared to the armature-shaft, a nut working on said screw-threaded shaft and held against rotation, and a brake-rod connected with, and actuated by, said nut, substantially as described.

6. The combination with a motor and a rigid frame therefor, a gland, tie-rods connecting said gland and frame, a screw-threaded shaft confined between said gland and frame, but free to rotate, and a gear connection between said shaft and the armature-shaft of the motor, of a nut working on said screw-threaded shaft, engaging and guided by the tie-rods, and a brake-rod connected to said nut, substantially as described.

7. The combination with a motor and a rigid frame therefor, a gland, tie-rods connecting said gland and frame, a screw-threaded shaft confined between said gland and frame, but free to rotate, and a gear connection between said shaft and the armature-shaft of the motor, of a nut working on said screw-threaded shaft, engaging and guided by the tie-rods, guide-rods secured to the nut and working through said gland, and a brake-rod connected to said guide-rods, substantially as described.

8. The combination with an electric motor, and a brake-rod connected with, and actuated by, said motor, of means, actuated by the motor, for automatically cutting out said motor at predetermined intervals of its operation, substantially as described.

9. The combination with an electric motor, and a brake-rod connected with, and actuated by, said motor, of a controller, a plurality of open circuits connecting said controller and motor, and devices actuated by the motor for automatically breaking said circuits, after they are closed through the controller, substantially as described.

10. The combination with an electric motor, a screw-threaded shaft driven thereby, a nut working on said shaft and held against rotation, and a brake-rod connected with and actuated by said nut, of a controller, a plurality of open circuits connecting said controller and motor, and devices carried by said nut for automatically breaking said circuits, after they are closed through the controller, substantially as described.

11. In an electric car-brake, the combination with an electric motor, a brake-rod connected with and actuated by said motor, and a yielding connection between said motor and rod, of means actuated by the motor for automatically cutting out said motor, substantially as described.

12. In an electric car-brake, the combination with an electric motor, a brake-rod connected with and actuated by said motor, and a yielding connection between said rod and motor, of means actuated by the motor for automatically cutting out said motor, at successive intervals of its operation in one direction, substantially as described.

13. In an electric car-brake, the combination with an electric motor, a controller, automatic cut-outs for the motor, and a screw-threaded shaft driven by the motor, of a nut working on said shaft and held against rotation, a brake-rod, and a yielding connection between said rod and nut, substantially as described.

14. In an electric car-brake, the combination with an electric motor, a screw-threaded shaft driven thereby, a nut working on said shaft and held against rotation, a brake-rod, and a yielding connection between said rod and nut, of means actuated by the motor for automatically cutting out said motor, substantially as described.

15. In an electric car-brake, the combination with an electric motor, a screw-threaded shaft driven thereby, a nut working on said shaft and held against rotation, a brake-rod, and a yielding connection between said rod and nut, of means actuated by the motor for automatically cutting out said motor, at successive intervals of its operation in one direction, substantially as described.

16. In an electric car-brake, the combination with an electric motor, a screw-threaded shaft driven thereby, a nut working on said shaft and held against rotation, a brake-rod, and a yielding connection between said rod and nut, of a controller, a plurality of open circuits connecting said controller and motor, and devices actuated by the motor for automatically breaking said circuits after they are closed through the controller, substantially as described.

17. In an electric car-brake, the combination with an electric motor, a screw-threaded shaft driven thereby, a nut working on said shaft and held against rotation, a brake-rod, and a yielding connection between said rod and nut, of a controller, a plurality of open circuits connecting said controller and motor, devices carried by said nut for automatically breaking said circuits after they are closed through the controller, substantially as described.

ALEXANDER B. RONEY.

Witnesses:
W. R. OMOHUNDRO,
PHILIP OPPER.